UNITED STATES PATENT OFFICE.

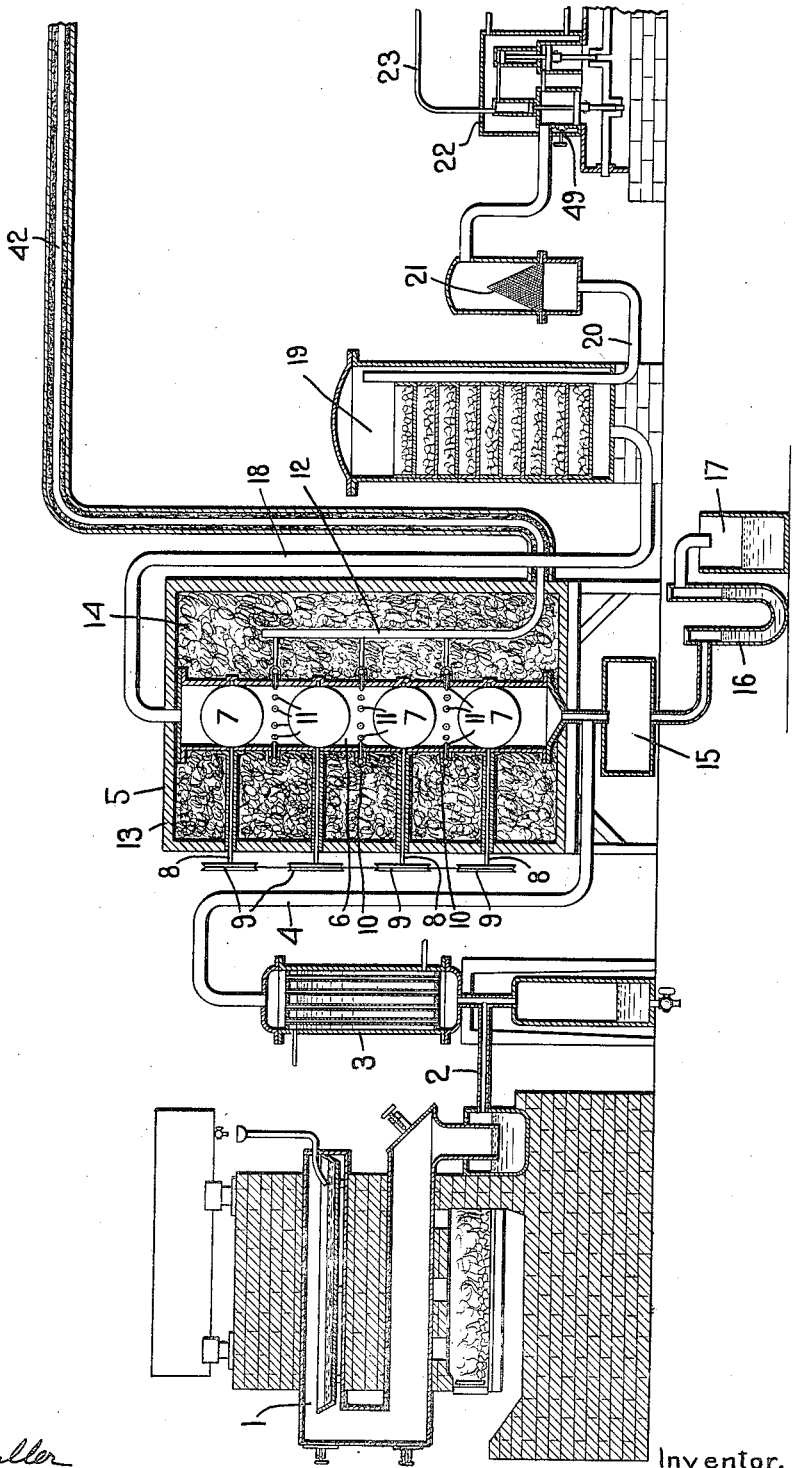

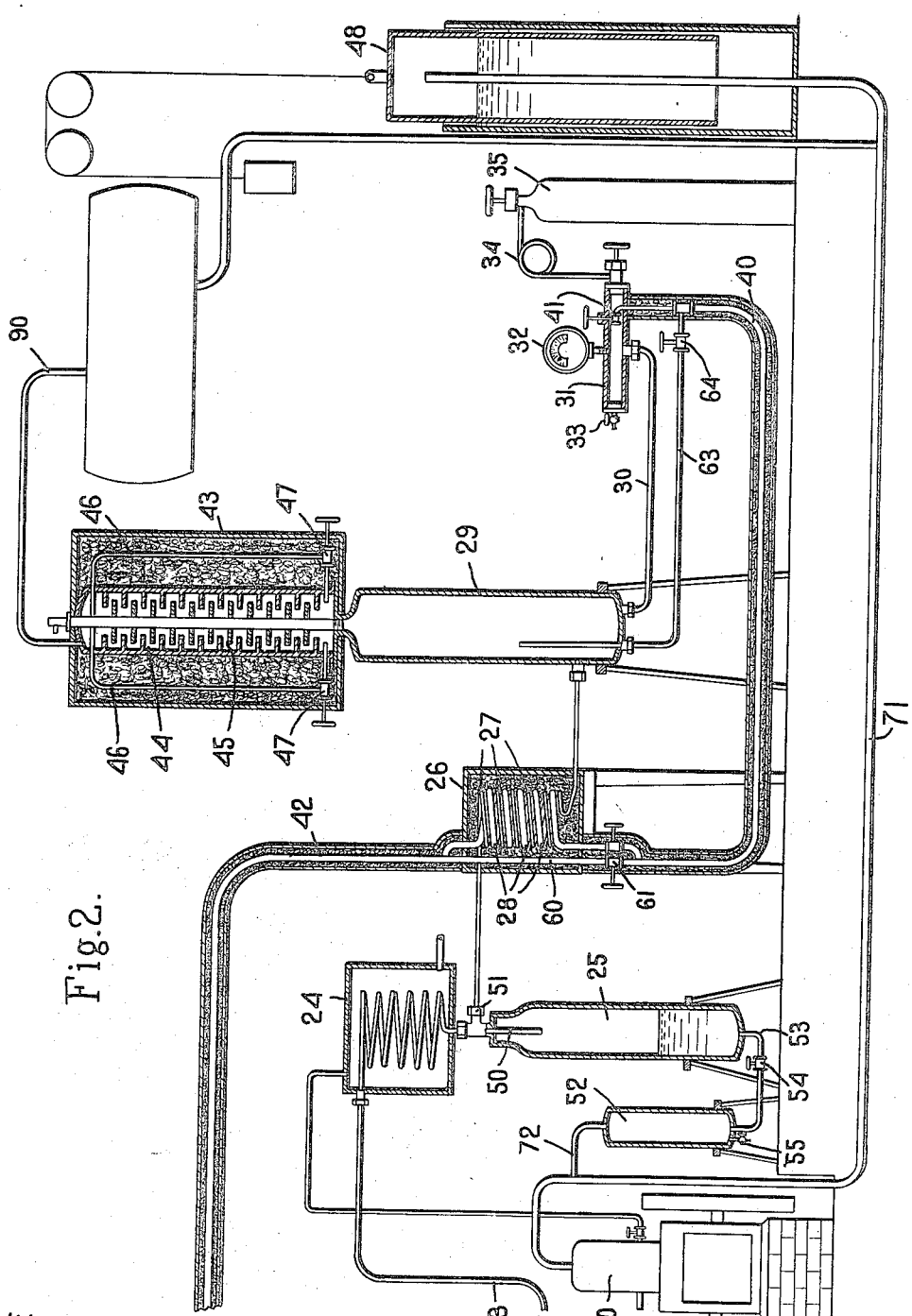

LINUS WOLF, OF CHICAGO, ILLINOIS.

APPARATUS FOR PRODUCING LIQUEFIED GAS.

1,240,397.  Specification of Letters Patent.  Patented Sept. 18, 1917.

Application filed December 3, 1913. Serial No. 804,333.

*To all whom it may concern:*

Be it known that I, LINUS WOLF, a subject of the Emperor of Germany, residing at Chicago, county of Cook, State of Illinois, have invented an Improvement in Apparatus for Producing Liquefied Gas, of which the following description, in connection with the accompanying drawing, is a specification, like characters on the drawing representing like parts.

This invention relates to an apparatus for producing a liquefied gas from distillation or natural gases. These gases contain various hydrocarbon constituents, some of which, such as gasolene or naphtha, are easily liquefiable, that is, they can be liquefied at atmospheric pressure by a moderate refrigeration, or at normal temperatures by moderate pressure, and others of which are much more difficult to liquefy and require either high refrigeration or high pressure or both to effect the liquefaction thereof.

The apparatus herein shown is designed to separate out from distillation or natural gases those hydrocarbon constituents which are relatively easy to liquefy, and to liquefy the remaining liquefiable constituents whereby a liquefied gas is produced which is free from the easily liquefiable hydrocarbon constituents of distillation gases. A liquefied gas of this nature when vaporized can be used for heating, lighting and power purposes. The separation of the easily liquefiable constituents from the remaining constituents of distillation or natural gases is effected by mixing with the distillation gas a similar gas at a very low temperature, this operation resulting in reducing the temperature of the distillation or natural gases to the point where the easily-liquefiable constituents become liquid and can then be separated from the gas.

The apparatus herein shown also contains a novel construction by which the liquefaction of the desired constituents of the distillation gases can be facilitated.

In order to illustrate the principle of the invention I have shown it as it would be used in the treatment of distillation gas but it will be understood that by proper modifications it could be equally used in the treatment of natural gas. The drawings show a selected embodiment of my invention which will now be described and the novel features of the invention will then be pointed out in the appended claims.

Figure 1 is a more or less diagrammatic view showing part of an apparatus embodying my invention;

Fig. 2 is a similar view showing the remainder of the apparatus.

In the drawings 1 designates generally a suitable retort in which distillation gases are formed by distillation of crude oil. This retort may have any suitable or usual construction. The distillation gases are taken from the retort through a pipe 2 and led into a cooling device 3 of usual construction by which the tar and other similar heavy products are separated. From the cooler 3 the gases are taken through a pipe 4 through a cooling apparatus 5 in which the gas is cooled to a point sufficient to liquefy the easily-liquefiable hydrocarbon constituents. The cooling in this apparatus is accomplished by mixing with the distillation gases a similar gas which has a very low temperature, this operation resulting in reducing the temperature of the distillation gases to a point where the easily-liquefiable hydrocarbon constituents become liquefied.

The cooling device herein illustrated comprises a cooling chamber 6 into the lower end of which the pipe 4 leads, said cooling chamber having situated within it agitators or mixers 7 by which the gas passing therethrough is mixed or agitated. These mixers are shown in the form of blades mounted on shafts 8 journaled in suitable bearings, and the shafts carry pulleys 9 which are connected by belts with some source of power, the construction being such that the adjacent agitators are rotated in opposite directions. The low temperature gases are preferably introduced into the cooling chamber at several points along its length. In the embodiment herein shown the cooling chamber has associated therewith at various points an annular spray device 10 provided with nozzles 11 extending through the wall of the chamber 6, said nozzles operating to deliver the gas into said chamber from all sides thereof. This gas is supplied to these spray devices 10 through a supply pipe 12. The low temperature gas which is thus used for cooling the distillation gases in the chamber 6 is distillation gas which has been previously liquefied and which has secured its low temperature by being expanded from a high pressure to the pressure of the distillation gases in the cooling chamber 6.

The cooling chamber 6 is placed in a casing 13 filled with suitable insulating material 14 so as to prevent any loss of heat by radiation. As the distillation gases pass through the cooling chamber 8 and are thus cooled by being mixed with the low temperature gases the easily-liquefiable hydrocarbon constituents, such, for instance, as gasolene or naphtha, become liquefied, and as they thus become liquefied they collect in a chamber or tank 15 having a sealed outlet pipe 16 that delivers into a collecting tank or receptacle 17. The object of the sealed outlet pipe is to prevent the admission of air to the chamber 15 while at the same time permitting the liquid to be freely discharged from the chamber 15 as it collects therein.

From the cooling chamber 6 the distillation gases which are not liquefied in the cooler are taken through a pipe 18 to a scrubber 19 of any usual construction by which the sulfur is removed, and from the scrubber the gases pass through a pipe 20, to a filter 21, and thence to a compressor 22 by which the gases are highly compressed, say to about fifteen to eighteen hundred pounds. From the compressor the compressed gases pass through a pipe 23 to a water cooler 24 which partially cools them, and from the cooler 24 the gases are taken to a refrigerating apparatus 26 in which they are cooled while under pressure to a sufficient temperature to effect the liquefaction of substantially all the gases that it is desired to liquefy.

This refrigerating apparatus is in the form of a reverse current device, it comprising a coil 27 through which the compressed gases pass, and a reverse current coil 28 through which the refrigerating gases pass. From the refrigerating apparatus the gas passes into a collecting chamber 29 in which the liquefied gas accumulates. This collecting chamber 29 has a delivery pipe 30 connected thereto leading to a chamber 31 provided with a pressure gage 32, test cock 33, etc., and from this chamber the liquefied gas is delivered through a pipe 34 to a steel tank or bottle 35, in which it is stored for shipment.

The refrigerating medium that is used in the reverse current coil 28 of the refrigerating apparatus is liquefied gas taken from the collecting chamber 29. The chamber 31 has a pipe 40 connected thereto which is controlled by a suitable valve 41, and this pipe 40 leads to the reverse current coil 28 so that by opening the valve 41 some of the liquefied gas which is under high pressure expands into said pipe and the reverse current coil 28, such expansion producing the low temperature required for the liquefaction of the gases. After the refrigerating gases have passed through the refrigerating apparatus they are taken through a pipe 42 to the delivery pipe 12 and are delivered to the cooling chamber 6, these gases constituting the low temperature gases that are used for effecting the cooling of the distillation gases in the cooler 6.

Distillation gases produced from crude oil contain some hydrocarbons which are extremely difficult to liquefy, and these hydrocarbons will pass over into the collecting chamber 29 in a gaseous, rather than a liquid state. In order to continue the liquefying process and thus secure the liquefaction of some of these higher gases, I provide a refrigerating apparatus in connection with the collecting tank 29 which is constructed to continue the refrigerating process on the gases which accumulate in said collecting tank 29. For this purpose said tank is provided with an extension 43 in which the gases will accumulate, and this extension has associated therewith a refrigerating apparatus. In the illustrated embodiment of my invention this refrigerating apparatus comprises a casing 44 surrounding the extension 43 and provided with baffle-plates 45 to make a circuitous passage therethrough. The extension 43 has connected thereto at its upper end a pipe 46 leading around into the lower side of the casing 44, said pipe being controlled by a suitable valve 47. By opening the valve 47 the gases under high pressure in the extension 43 are expanded into the casing 44, and thus produce a refrigerating action which reduces the temperature of the gases in said extension and causes liquefaction of a portion thereof. The gases which have passed through the casing 44 may be taken through a pipe 90 to a gasometer 48. I will preferably provide two pipes 46, each having a valve 47 therein so that in case one pipe or valve becomes frozen up the other can be used. By this construction I can liquefy a much larger proportion of the distillation gases than is possible without the additional refrigerating apparatus in connection with the extension 43.

The proper operation of the compressor 22 requires that the pistons should be kept properly lubricated, and I have found that this can best be done by admitting to the gas which is to be compressed a certain amount of moisture, the moisture providing the necessary lubrication. The compressor 22 will be water-jacketed to keep it cool, as usual in compressors, and I have shown the water jacket herein as provided with a valve 49 by which a proper quantity of water from the jacket can be admitted to the cylinder. A slight quantity is sufficient for this purpose. This water is converted into vapor by the heat of compression and is delivered from the compressor with the gases through the pipe 23. It is necessary to remove this water from the gas before the latter is liquefied in the refrigerating apparatus 26, and to provide for this I employ a separating tank 25 connected to the water cooling coil 24 and through which the compressed gases pass on their way to the refrigerating apparatus 26. This collecting chamber 25 is somewhat in the nature of a trap, the pipe 50 from the coil 24 entering the top of the collecting chamber and extending part way to the bottom and the outlet 51 from the chamber being above the discharge end of the pipe 50. The moisture in the gas will be condensed in the cooling apparatus 24 and will collect in the bottom of the collecting chamber 25. In order to draw this water off I provide a second chamber 52 connected to the lower end of the chamber 25 by a pipe 53 having a valve 54 therein, and the chamber 25 is provided with a drip cock 55. When water accumulates in the tank 25 the valve 54 is opened and the pressure will force the water around into the tank 52 after which the valve 54 may be closed and the water allowed to drain out through the tank 52 through the drip cock 55.

In order to regulate the degree of refrigeration attained in the refrigerating apparatus 26, I have provided a by-pass 60 controlled by a valve 61 through which the refrigerating medium or a part thereof can be shunted around the counter-current coil 28. In order to still further regulate this refrigerating action I have provided means whereby the gas which is expanded in the counter-current coil may be taken either from the bottom of the collecting tank 29 or from a point some distance from the bottom. The liquid at the bottom of the collecting tank 29 will have less of the gaseous constituents therein than that toward the upper part of the tank because as the liquefied gas is delivered to the tank 29 from the reverse current coil 28, the unliquefied gaseous constituents will tend to rise in the tank so that the liquid in the upper portion of the tank will contain a greater proportion of the gaseous constituents than that in the lower part of the tank. Accordingly the specific gravity of the liquid will be greater at the bottom of the tank than it is part way up in the tank. 63 is a pipe which leads into the bottom of the tank 29 and terminates some distance above the bottom, said pipe leading to and communicating with the pipe 40 and being controlled by a suitable valve 64. By means of the two valves 41 and 64 the liquid in the counter-current coil 28 may be taken either from the bottom or from the middle portion of the tank 29, and by this means the degree of refrigeration can be controlled.

I have shown at 70 an internal combustion engine for operating the compressor. This is supplied with fuel from the gasometer 48 by means of a pipe 71. The tank 52 is also connected to the pipe 71 by means of a pipe 72 so that any surplus gas accumulating in said tank may be delivered to the motor.

In operating my apparatus I propose to connect the outlet of the water cooler 24 to the jacket of the internal combustion engine 70 and thus the water which is used in the cooler is also made use of for cooling the engine. For operating the apparatus I find that it is desirable to use warm water in the jacket of the compressor. I do this so as to avoid the possibility of the gas becoming cooled in the compressor to a point where some of the constituents will become liquefied, for the presence of liquid in the compressor will interfere with its operation. It is desirable to remove some of the heat of compression in the condenser, but not to cool the gas to the point where any portion of it will become liquefied.

While I have herein illustrated the invention as it would be used in the treatment of distillation gases, yet I desire to state that the invention is equally applicable to the treatment of so-called natural gas. Where natural gas is being treated no retort for the production of the gas is necessary, as the gas from the supply will be piped directly to either the cooling device 3 or the cooling device 5. In other respects, however, the treatment of natural gas will be similar to that above described.

Having fully described my invention, what I claim as new and desire to secure by Letters Patent is:

1. In an apparatus for producing liquefied constituents of a gas containing hydrocarbon constituents, the combination with a cooling chamber, of means to cause the gas to pass therethrough, means to compress said gas and liquefy the liquefiable constituents thereof, and means to return a portion of the liquefied gas to the cooling chamber and to allow it to expand therein and become commingled with the gas passing therethrough whereby the gas in the cooling chamber is highly refrigerated by being commingled with the cold gas produced by the expansion of the liquefied gas.

2. An apparatus such as set forth in claim 1 in combination with mechanical agitators within the cooling chamber for assisting in mixing the expanded cold liquefied gas with the gas passing through the cooling chamber.

3. In an apparatus of the class described, the combination with means to cool a hydrocarbon gas and separate therefrom the easily-liquefiable constituents, of means to subject the remaining constituents to a high degree of pressure and severe refrigeration thereby to liquefy all the constituents except those most difficult to liquefy, a collecting chamber into which both the liquefied and remaining gaseous constituents are delivered, and means to subject the gaseous constituents in said chamber to further refrigeration.

4. In an apparatus of the class described, the combination with means to cool a hydrocarbon gas and separate therefrom the easily-liquefiable constituents, of means to subject the remaining constituents to a high degree of pressure and severe refrigeration thereby to liquefy all the constituents except those most difficult to liquefy, a collecting chamber into which both the liquefied and remaining gaseous constituents are delivered, and means associated with said chamber to subject the gaseous constituents therein to further refrigeration.

5. In an apparatus of the class described, the combination with means to cool a hydrocarbon gas and separate therefrom the easily liquefiable constituents, of means to subject the remaining constituents to a high degree of pressure and severe refrigeration thereby to liquefy all the constituents except those most difficult to liquefy, a collecting chamber into which both the liquefied and remaining gaseous constituents are delivered, said collecting chamber having an extension in which the gaseous constituents collect, and means to subject the gaseous constituents in said extension to further refrigeration.

6. In an apparatus of the class described, the combination with means to cool a hydrocarbon gas and separate therefrom its easily-liquefiable constituents, of a compressor to compress the gaseous constituents, means to admit water to the cylinder of the compressor to provide lubrication therefor, of means to condense the moisture in the gas after it leaves the compressor and to separate the moisture from the gas, and means to refrigerate the gas after the moisture has been separated therefrom thereby to liquefy the same.

In testimony whereof, I have signed my name to this specification, in the presence of two subscribing witnesses.

LINUS WOLF.

Witnesses:
E. H. SIEKMANN,
FRED WM. LANDSEA.